United States Patent Office 2,739,956
Patented Mar. 27, 1956

2,739,956
METHOXY VINYLNAPHTHALENES AND POLYMERS THEREOF

Jack L. R. Williams, Rochester, N. Y., assignor to Eastman Kodak Company, Rochester, N. Y., a corporation of New Jersey No Drawing. Application June 15, 1953,
Serial No. 361,815

11 Claims. (Cl. 260—47)

This invention relates to vinylnaphthalene compounds and particularly to alkoxy vinylnaphthalene and polymers thereof.

Certain alkoxyvinylnaphthalenes have previously been described in the literature but polymers of alkoxyvinylnaphthalenes have not previously been prepared. Van Allan, J. Org. Chem. pp. 999–1001, 1951, prepared 4-methoxy-1-vinylnaphthalene I and Cohen et al. prepared 6-methoxy-1-vinylnaphthalene II. The workers reported that compounds I and II form the respective Diels-Alder maleic anhydride adducts.

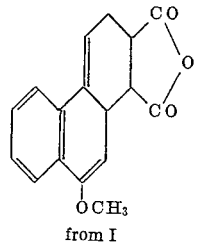
from I

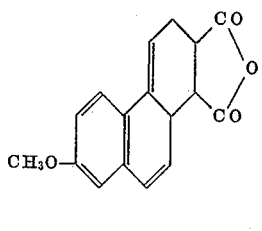
from II

I have discovered that alkoxyvinylnaphthalenes can be prepared by a more simple method than employed by the above prior art and that certain new isomeric alkoxyvinylnaphthalenes can be prepared by my process which cannot be prepared by the above prior processes. Also, the new alkoxyvinylnaphthalenes prepared by my process have properties distinct from the isomeric alkoxyvinylnaphthalenes of the prior art.

According to the process of my invention, alkoxyvinylnaphthalenes, such as 1-methoxy-2-vinylnaphthalene, as well as simple vinylnaphthalenes, such as 1-vinylnaphthalene, are prepared by pyrolyizing naphthylmethylcarbinol acetates according to the reaction

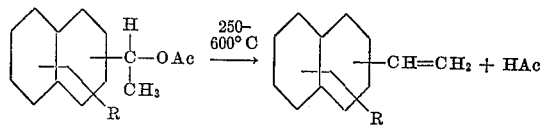

in which R is either a hydrogen atom or an alkoxy group such as methoxy, ethoxy and the like, preferably containing from 1 to 4 acrbon atoms.

The following representative alkoxyvinylnaphthalenes are readily prepared by this process:

I 4-methoxy-1-vinylnaphthalene
II 6-methoxy-1-vinylnaphthalene
III 6-methoxy-2-vinylnaphthalene
IV 1-methoxy-2-vinylnaphthalene Compounds III and IV have not previously been prepared and are particularly distinguished from compounds I and II by the fact that they do not form a Diels-Alder maleic anhydride adduct. Compound IV is particularly notable since its resinous polymers can be demethylated so as to yield a 2-vinyl-1-naphthol polymer of use in color photography as a dye coupler for silver halide emulsion layers developed with primary aromatic amino silver halide developing agents. Polymers of compounds I, II and III, upon demethylation, do not couple with primary aromatic amino silver halide developing agents to form dye images in the emulsion layers.

The resinous polymers (both homopolymers and copolymers) of the alkoxyvinylnaphthalene compound such as polymers of compounds I–IV, form a valuable part of my invention. The polymers are obtained by application of well-known methods of polymerization preferably including the use of heat, ultraviolet light and polymerization catalyst such as benzoyl peroxide, hydrogen peroxide, or potassium persulfate. Copolymers of the alkoxyvinylnaphthalenes are prepared in a well-known manner by polymerization of a mixture of about 5 to 95 percent of the alkoxyvinylnaphthalene compound, preferably in the presence of catalysts, with about 95 to 5 percent of one or more compounds containing a polymerizable —CH=C'— group such as maleic anhydride, vinyl halides, acrylic and alkacrylic acids, amides and esters, fumarates, maleates, α-acylamido acrylic acids and esters, alkylalkenyl ketones, α-acyloxyalkenonitriles, alkenylnitriles, and hydrocarbons containing conjugated olefinic unsaturation such as the styrenes. Specific compounds useful in making copolymers of the alkoxyvinylnaphthalene compounds are vinyl chloride, vinylmethyl ketone, methyl fumarate, acrylonitrile, styrene, o-, m-, p-methylstyrenes, methylmethacrylate, methylacrylate, acrylamide, and α-methacrylic acid. The polymers of the compounds of the invention are resinous materials distinct in physical properties from crystalline materials such as dimers of the alkoxyvinylnaphthalenes.

As will be apparent from the following description of my process for preparing the alkoxyvinylnaphthalene compounds, the selected naphthylmethylcarbinol acetate is passed through a zone such as a vitreous tube heated to a temperature of about 500° C. However, the pyrolysis can be carried out within a range of temperature of about 250 to 600° C. It is preferable to introduce the naphthylmethylcarbinol acetate into the pyrolytic chamber in conjunction with an inert solvent such as benzene although the compound can less readily be introduced in finely ground crystalline form. Following pyrolysis, the vinylnaphthalene compound is collected and washed free of acetic acid formed in pyrolysis of the carbinol ester and the product is recrystallized as usual.

EXAMPLE 1.—6-METHOXY-2-NAPHTHYL METHYLCARBINOL ACETATE

Reduction of 6-methoxy-2-acetonaphthone (J. Chem. Soc., 1394 (1939)) was carried out under standard hydrogenation conditions. In a 300-cc. void stainless steel bomb there was placed 30 g. (0.15 mole) of 6-methoxy-2-acetonaphthone, 175 cc. of methanol and 2 g. of a copper chromite catalyst. The bomb was pressurized with hydrogen such that at 125° the pressure was 3050 p. s. i. At that temperature hydrogenation occurred during one-half hour, after which time the pressure was 2650 p. s. i. The calculated cold drop was 300 pounds. Found 300 pounds. The catalyst was filtered and the reaction mixture evaporated to 75 cc. Upon addition of excess hexane, 23 g. of a white solid precipitated (77% yield) which melted at 104–105°. After recrystallization from benzene it melted at 113.5–114.5°.

Calculated for $C_{13}H_{14}O_2$: C, 77.3; H, 7.0. Found: C, 77.5; H, 7.1.

The white solid was treated with 100 cc. of acetic anhydride and 1 cc. of pyridine overnight on the steam cone. Distillation yielded 22 g. (79.5%) of a white solid, 6-methoxynaphthylmethylcarbinol acetate, boiling at 138–148°/0.3 mm. which after recrystallization from hexane melted at 60–61°.

Calculated for $C_{15}H_{16}O_3$: C, 73.8; H, 6.6. Found: C, 73.8; H, 6.7.

6-Methoxy-2-vinylnaphthalene

A mixture of 22 g. (0.089 mole) of the 6-methoxynaphthyl methylcarbinol acetate and 50 cc. of thiophene-free benzene was passed dropwise at the rate of one drop per second through a 25-mm. O. D. Pyrex tube packed for a distance of 30 inches with glass beads and heated to 500–510° C. by means of an electrically controlled furnace. The reaction products were caught in a Dry Ice trap, melted and washed free from acetic acid with water. The benzene was removed at the water pump and the residue recrystallized from benzene-hexane to yield 6 g. (36.5%) of product which melted at 91–92° C.

Calculated for $C_{13}H_{12}O$: C, 84.74; H, 6.57. Found: C, 84.2; H, 5.8.

In a slightly different procedure, the 6-methoxy-2-naphtholmethylcarbinol acetate was passed through the pyrolytic tube packed with Pyrex Raschig rings at the same rate, the temperature being from 495–505° C. From 50 grams of starting material, 21 grams of washed and hexane-recrystallized 6-methoxy-2-vinylnaphthalene was obtained M. P. 93–94° and an additional 4 grams M. P. 91–92° from the hexane mother liquors.

EXAMPLE 2.—HOMOPOLYMERIZATION OF 6-METHOXY-2-VINYLNAPHTHALENE

A solution of 1 g. of 6-methoxy-2-vinylnaphthalene and 0.01 g. of benzoyl peroxide in 5 ml. of dioxane was heated 20 hours at 100°. The polymer was precipitated by pouring the reaction mixture into excess ethanol.

Calculated for $[C_{12}H_{12}O]_n$: C, 84.8; H, 5.0. Found: C, 84.3; H, 6.3.

EXAMPLE 3.—COPOLYMERIZATION OF 6-METHOXY - 2 - VINYLNAPHTHALENE WITH MALEIC ANHYDRIDE

A solution of 1.8 g. (0.01 mole) of 6-methoxy-2-vinylnaphthalene and 0.98 g. (0.01 mole) maleic anhydride in 40 ml. of dioxane was heated under reflux for 18 hours. The solution was poured into excess methanol, and the polymer thereby precipitated. The dry weight of polymer was 2.4 g.

Calculated for $[C_{17}H_{14}O_4]_n$: C, 72.3; H, 5.0. Found: C, 70.3; H, 5.5.

EXAMPLE 4.—FURTHER COPOLYMERS OF 6-METHOXY-2-VINYLNAPHTHALENE

A solution of 1 g. (0.054 mole) of 6-methoxy-2-vinylnaphthalene, 0.054 mole of comonomer and 1% of total monomer weight of benzoyl peroxide in 5 cc. of dioxane was heated at 100° for 24 hours and precipitation of the polymer carried out in solvents as listed below:

| Comonomer | Solvent Precipitation | Percent Conversion | C | H | N |
|---|---|---|---|---|---|
| Styrene | Methanol | 63.5 | 86.5 | 6.6 | |
| p-Methylstyrene | do | 61.0 | 86.3 | 6.8 | |
| Methylacrylate | do | 50.0 | 79.5 | 6.2 | |
| Acrylamide | Water | 86.0 | 79.0 | 6.4 | 2.0 |
| Acrylonitrile | Methanol | 69.0 | 85.7 | 6.3 | |
| 2,5-Diacetoxystyrene | do | 68.0 | 75.0 | 6.0 | |

2,5-diacetoxystyrene is prepared by the method of Reynolds et al. U. S. patent application Serial No. 282,456 filed April 15, 1952.

EXAMPLE 5.—1-METHOXY-2-NAPHTHYL METHYLCARBINOL

A mixture of 40 g. or 0.2 mole of 1-methoxy-2-acetonaphthone, 4 g. of copper chromite catalyst (Harshaw Cu-X-649-57-P) and sufficient ethanol to make a final volume of 150 cc. was hydrogenated at 115 c. until 0.2 mole hydrogen had been absorbed. The cooled reactor was opened, the contents filtered, and the alcohol evaporated at the water pump to give 36.8 g. of 1-methoxy-2-naphthyl methyl carbinol, M. P. 89–91° C. The melting point of the sample of material recrystallized from hexane was 92–93° C.

1-methoxy-2-vinylnaphthalene

The carbinol prepared above was acetylated as in Example 1 and the resulting 1-methoxy-2-naphthyl methylcarbinol acetate was pyrolyzed by the method of Example 1 to give 1-methoxy-2-vinylnaphthalene. However, since the yield was very low the following procedure can be used to advantage to obtain the compound by pyrolysis of 1-methoxy-2-naphthyl methylcarbinol:

A solution of 15 parts of 1-methoxy-2-naphthylmethylcarbinol in 200 parts of thiophene-free benzene was passed during one-half hour through a glass tube packed with activated alumina and maintained at 350° by means of an electric furnace. By distillation there was obtained 1.6 parts of 1-methoxy-2-vinylnaphthalene, B. P. 83–84° C. (0.3 mm.).

EXAMPLE 6.—HOMOPOLYMERIZATION OF 1-METHOXY-2-VINYLNAPHTHALENE

A 0.1 g. sample of 1-methoxy-2-vinylnaphthalene prepared above was heated with 0.001 g. of benzoyl peroxide for 72 hours at 80° C. to yield a clear hard polymer.

Copolymers of 1-methoxy-2-vinylnaphthalene with other polymerizable compounds such as those given above, are obtained by methods such as shown in Examples 3 and 4.

Other alkoxyvinylnaphthalenes such as 4-methoxy-1-vinylnaphthalene and 6-methoxy-1-vinylnaphthalene can be prepared in the manner of the above examples by pyrolysis of the corresponding alkoxynaphthylcarbinol acetate such as 4-methoxy-1-naphthylmethylcarbinol acetate and 6-methoxy-1-naphthylmethylcarbinol acetate. The homopolymers and copolymers of these alkoxyvinylnaphthalenes with polymerizable compounds such as those indicated above are prepared in a manner similar to that set forth in the above examples.

What I claim is:

1. A compound selected from the group consisting of 1-methoxy - 2 - vinylnaphthalene and 6-methoxy-2-vinylnaphthalene.

2. 1-methoxy-2-vinylnaphthalene.

3. 6-methoxy-2-vinylnaphthalene.

4. A resinous polymer of a compound selected from the group consisting of 1-methoxy-2-vinylnaphthalene and 6-methoxy-2-vinylnaphthalene.

5. A resinous polymer of 1-methoxy - 2 - vinylnaphthalene.

6. A resinous polymer of 6-methoxy - 2 - vinylnaphthalene.

7. A resinous copolymer obtained by polymerizing a mixture comprising 1-methoxy-2-vinylnaphthalene and a different compound containing a polymerizable —CH=C< group.

8. A resinous copolymer obtained by polymerizing a mixture comprising 6-methoxy-2-vinylnaphthalene and a different compound containing a polymerizable —CH=C< group.

9. A resinous copolymer obtained by polymerizing a mixture comprising 6-methoxy-2-vinylnaphthalene and a compound of the group consisting of maleic anhydride, styrene, p-methylstyrene, methacrylate, acrylamide, acrylonitrile, and 2,5-diacetoxystyrene.

10. A method for preparing 1-methoxy-2-vinylnaphthalene which comprises passing 1-methoxy-2-naphthylmethylcarbinol acetate through a zone heated to a temperature of from about 250–600° C.

11. A method for preparing 6-methoxy-2-vinylnaphthalene which comprises passing 6-methoxy-2-naphthylmethylcarbinol acetate through a zone heated to a temperature of from about 250–600° C.

References Cited in the file of this patent

UNITED STATES PATENTS

| | | |
|---|---|---|
| 2,310,762 | Daumiller et al. | Feb. 9, 1943 |
| 2,522,501 | Brooks et al. | Sept. 19, 1950 |
| 2,647,883 | Evans et al. | Aug. 4, 1953 |

OTHER REFERENCES

Van Allan: Journal Org. Chem., vol. 16, pages 999–1001, 1951.

Bachmann et al.: Journal American Chemical Society, vol. 70, 1948, pages 1462–1468.

Cohen: Journal Chemical Society, London, 1937, pages 1315–1317 and 1319.

Kolesnikov et al.: Chemical Abstracts, vol. 45, 1951, page 7553, being an abstract of Zhur. Obschei. Kheim, vol. 21, pages 397–401, 1951.

Weygand: Organic Preparations, Interscience, 1945, pages XI, 318, 322.

Schildknecht: Vinyl and Related Polymers, Wiley, 1952, pages 159–161.